(12) United States Patent
Kamiyama

(10) Patent No.: US 9,701,157 B2
(45) Date of Patent: *Jul. 11, 2017

(54) VEHICLE WHEEL

(71) Applicant: HONDA MOTOR CO., LTD., Minato-ku, Tokyo (JP)

(72) Inventor: Youichi Kamiyama, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/769,954

(22) PCT Filed: Feb. 19, 2014

(86) PCT No.: PCT/JP2014/053848
§ 371 (c)(1),
(2) Date: Aug. 24, 2015

(87) PCT Pub. No.: WO2014/132850
PCT Pub. Date: Sep. 4, 2014

(65) Prior Publication Data
US 2016/0016430 A1    Jan. 21, 2016

(30) Foreign Application Priority Data

Feb. 28, 2013  (JP) ................. 2013-038215

(51) Int. Cl.
*B60B 21/12* (2006.01)
*B60C 19/00* (2006.01)
*B60B 21/02* (2006.01)

(52) U.S. Cl.
CPC ............. *B60B 21/12* (2013.01); *B60B 21/02* (2013.01); *B60B 21/026* (2013.01);
(Continued)

(58) Field of Classification Search
CPC ... B60B 21/12; B60B 21/02; B60B 2900/111; B60C 19/002
(Continued)

(56) References Cited

U.S. PATENT DOCUMENTS

| | | | |
|---|---|---|---|
| 6,422,655 B1 * | 7/2002 | Britton | .................. B60C 19/002 |
| | | | 152/153 |
| 6,516,849 B2 * | 2/2003 | Flament | .................... B60C 3/06 |
| | | | 152/381.5 |

(Continued)

FOREIGN PATENT DOCUMENTS

| | | |
|---|---|---|
| CN | 101423005 A | 5/2009 |
| JP | H04-159101 A | 6/1992 |

(Continued)

OTHER PUBLICATIONS

Notice of Reasons for Rejection dispatched Nov. 10, 2015 for counterpart Japanese Application JP2015-502877.

(Continued)

*Primary Examiner* — S. Joseph Morano
*Assistant Examiner* — Jean Charleston
(74) *Attorney, Agent, or Firm* — Carrier Blackman & Associates, P.C.; Joseph P. Carrier; Jingli Wang

(57) ABSTRACT

A vehicle wheel of the present invention, includes: a sub air chamber member which serves as a Helmholtz resonator and is fixed to an outer circumferential surface of a well portion in a tire air chamber; a first standing wall surface formed such as to stand from the outer circumferential surface of the well portion outward in radial direction and extend in circumferential direction of the outer circumferential surface; and a second standing wall surface formed on the well portion such as to face the first standing wall surface in width direction of the outer circumferential surface.

7 Claims, 7 Drawing Sheets

(52) U.S. Cl.
CPC ....... *B60C 19/002* (2013.04); *B60B 2900/111* (2013.01); *B60B 2900/133* (2013.01)

(58) Field of Classification Search
USPC ......... 152/381.5, 381.6, 400, 516, 518, 519, 152/520
See application file for complete search history.

(56) References Cited

U.S. PATENT DOCUMENTS

| | | | | |
|---|---|---|---|---|
| 7,690,410 | B2* | 4/2010 | Kamiyama | ............. B60B 3/044 152/381.5 |
| 8,196,628 | B2* | 6/2012 | Fowler-Hawkins | .. B60C 19/002 152/339.1 |
| 2001/0007268 | A1* | 7/2001 | Yukawa | ................ B60B 21/023 152/381.6 |
| 2008/0277997 | A1 | 11/2008 | Kamiyama et al. | |
| 2009/0108666 | A1 | 4/2009 | Kashiwai et al. | |

FOREIGN PATENT DOCUMENTS

| | | | |
|---|---|---|---|
| JP | 2008-120222 | A | 5/2008 |
| JP | 2008-279873 | A | 11/2008 |
| JP | 2008-279911 | A | 11/2008 |
| JP | 2010-095147 | A | 4/2010 |
| JP | 4551422 | B2 | 9/2010 |
| JP | 2012-045971 | A | 3/2012 |
| JP | 2012051397 | A | 3/2012 |

OTHER PUBLICATIONS

Office Action of Feb. 21, 2017 issued in the counterpart Chinese Patent Application 20148000834.7 with the English translation thereof.
Office Action of Mar. 7, 2017 issued in the counterpart Japanese Patent Application 2016-088560—references therein were previously disclosed in IDS.
Japanese Office Action issued in the counterpart JP Patent Application 2015-502877, dated Feb. 28, 2017.

* cited by examiner

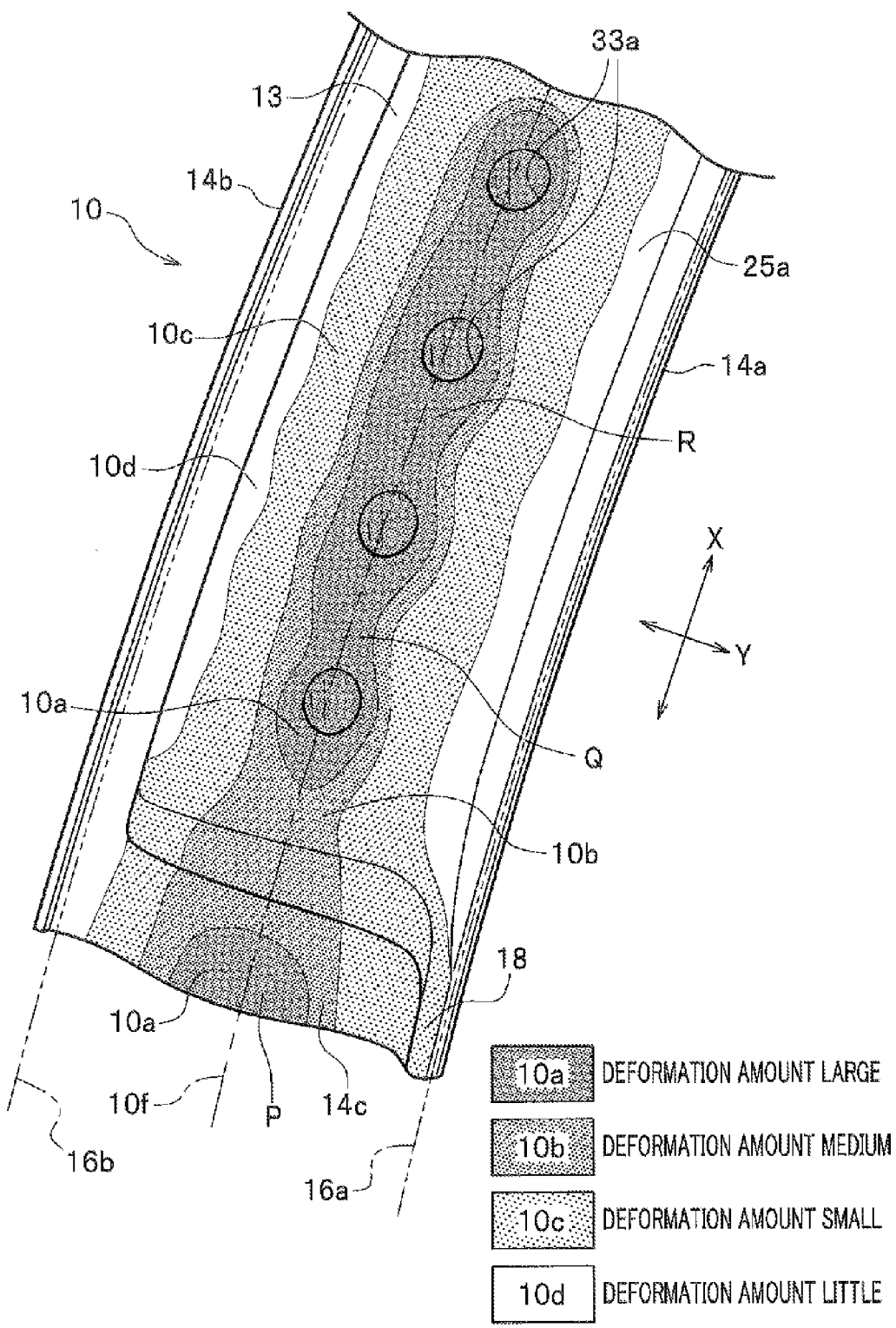

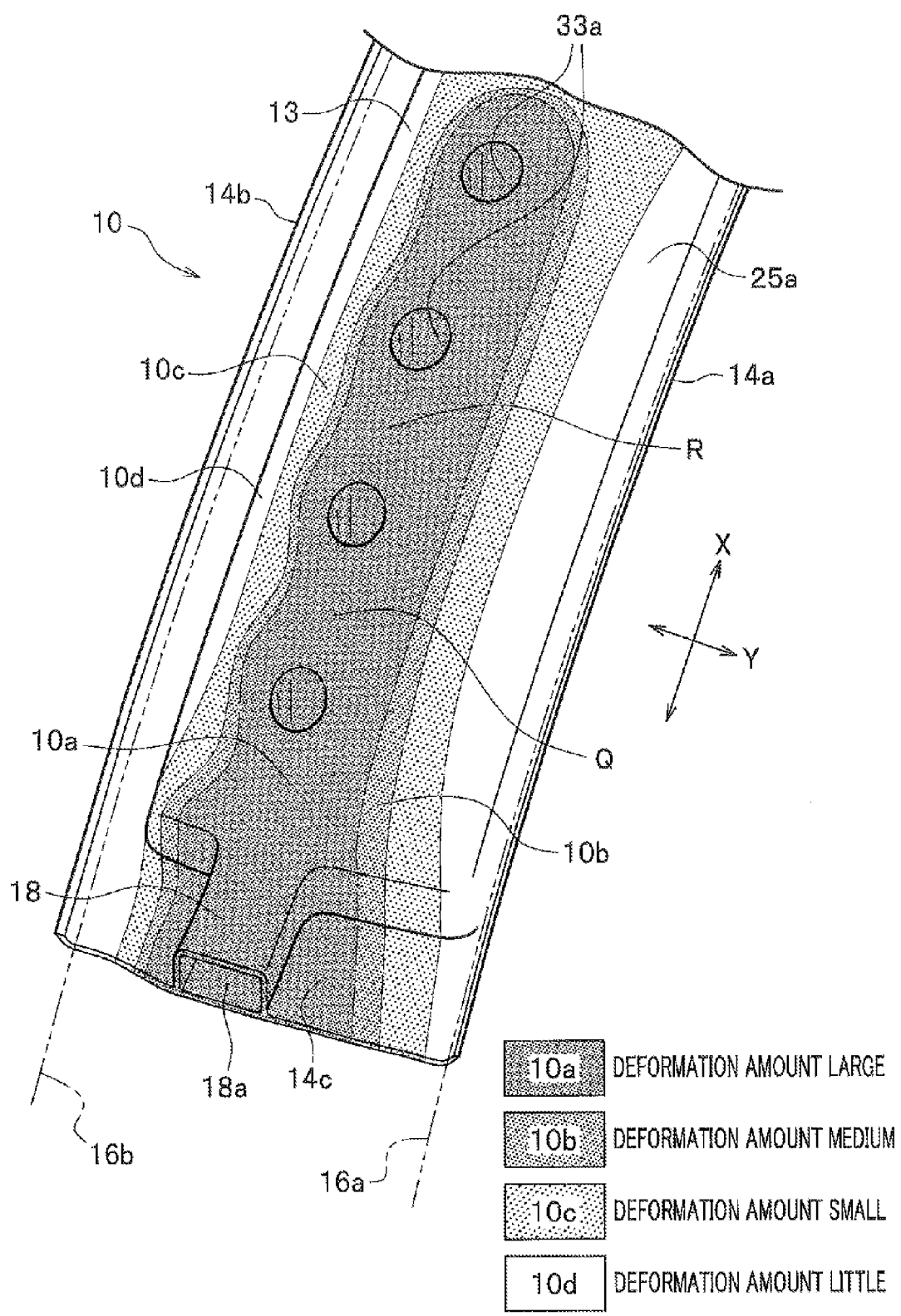

VEHICLE WHEEL

TECHNICAL FIELD

The present invention relates to a vehicle wheel.

BACKGROUND ART

Conventionally, as a wheel that reduces the road noise caused by air column resonance in the air chamber of a tire, there are presented various wheels provided with Helmholtz resonators each having a sub air chamber communicating with the air chamber of a tire through a communication hole. As such a vehicle wheel, desirable is a vehicle wheel that has a structure in which a Helmholtz resonator (a sub air chamber member) can be easily and firmly attached to the outer circumferential surface of the well portion. In this situation, as disclosed for example by Patent Literature 1, the inventor has already presented a vehicle wheel with a structure that includes a sub air chambers on the inner side of a main body portion formed by an upper plate and a bottom plate, wherein the main body portion is attached to the outer circumferential surface of a well portion through the plate-shaped edge or fringe portions respectively extending from the respective sides of this main body portion.

In more detail, this vehicle wheel is provided with a pair of standing wall surfaces formed such as to extend along the circumferential direction of the outer circumferential surface of the well portion, and the main body portion is disposed substantially at the center between the standing wall surfaces facing each other. The respective tip ends of the edged portions extending from the main body portion are engagingly fixed to the respective standing wall surfaces.

RELATED ART DOCUMENT

Patent Literature

JP 4,551,422 B1

DISCLOSURE OF THE INVENTION

Problems to be Solved by the Invention

In a conventional vehicle wheel (for example, see Patent Literature 1), the above-described communication hole of a Helmholtz resonator protrudes from a main body portion having a sub air chamber. This communication hole is formed inside a protruding portion formed for example by a tube member. Particularly, in a vehicle wheel (for example, see FIG. 9B of Patent Literature 1) in which a main body portion is longitudinal in the circumferential direction of the wheel and the protruding portion is arranged such as to protrude from the end portion, with respect to the circumferential direction, of the main body portion, the communication hole is arranged substantially at the central portion along the wheel width direction of the sub air chamber member, in other words, substantially at the middle position between the both standing wall surfaces.

FIG. 7 referred to in the following is a partial enlarged perspective view in the vicinity of the protruding portion of a sub air chamber member of a conventional vehicle wheel.

As shown in FIG. 7, a sub air chamber member 10 of this vehicle wheel is provided with a main body portion 13 which is longitudinal in the wheel circumferential direction X, and a tube body 18 arranged such as to protrude from the end portion, with respect to the wheel circumferential direction X, of the main body portion 13.

Incidentally, the main body portion 13 is provided with an upper plate 25a and a bottom plate, not shown, arranged on the side (the rear side of the sheet of FIG. 7) opposite to the upper plate 25a. A sub air chamber (not shown) is formed between the upper plate 25a and the bottom plate (not shown). A communication hole 18a formed inside the tube body 18 communicates with this sub air chamber.

The tip ends of both edge portions 14a, 14b extending along wheel width direction Y from the main body portion 13 are engagingly fixed to the first and second standing wall surfaces 16a, 16b (schematically shown by virtual lines in FIG. 7) formed on the outer circumferential surface of the well portion (not shown).

The sub air chamber member 10 is provided with an extending portion 14c of a plate-shaped body, the extending portion 14c extending from the end portion of the main body portion 13 along the wheel circumferential direction X. The extending portion 14c is in a curve-shape convex on the outer circumferential surface of the well portion. The both ends of the extending portion 14c are engagingly fixed to the first and second standing wall surfaces 16a, 16b.

In FIG. 7, symbols 33a represent joint portions joining the upper plate 25a and the bottom plate, wherein the upper plate 25a is partially recessed toward the bottom plate (not shown).

The shaded portions categorized in three kinds by gray scale represent the state of deformation of the sub air chamber member 10 due to the centrifugal force generated at the maximum assumed rotational speed of the wheel, as deformation amount distribution. Incidentally, the deformation amount herein was obtained by a simulation testing by CAE (Computer Aided Engineering). The darkest shaded portion 10a out of these shaded portions represents the region with the largest deformation amount (lifted degree) from the outer circumferential surface of the well portion to the centrifugal direction. The shaded portion 10b, which is the second-darkest after the darkest shaded portion 10a, represents the region with a medium deformation amount (lifted degree). The palest shaded portion 10c represents the region with a small deformation amount (lifted degree). The hollow portion 10d represents the region with little deformation.

In a sub air chamber member 10 of such a conventional vehicle wheel, as shown in FIG. 7, the deformation amounts of the end portion, with respect to the wheel circumferential direction X, of the main body portion 13 and the extending portion 14c are the largest due to the centrifugal force during rotation of the wheel. In other words, little deformation occurs on the sub air chamber member 10 in the vicinity of the both tip ends of the edged portions 14a, 14b, which are engagingly fixed to and strongly constrained by the first and second standing wall surfaces 16a, 16b (see the hollow portion 10d). However, the closer to the central portion in the wheel width direction Y from the both tip ends of the edged portions 14a, 14b engaged to the first and second standing wall surfaces 16a, 16b, the larger the deformation amount of the sub air chamber member 10 from the shaded portions 10c, 10b to the darkest shaded portion 10a.

Incidentally, although not shown, in comparison with a sub air chamber member with assumption that a tube body 18 is not arranged at the end portion of the main body portion 13, the deformation amount in the centrifugal direction of the portion formed by integration of the tube body 18 and the extending portion 14c of the sub air chamber member 10, shown in FIG. 7, increased by 33%. The deformation amount (the length of displacement in the direction perpendicular to the surface at the position Q) of the bottom plate (not shown) at the position Q increased by 64%. The deformation amount (the length of displacement in the direction perpendicular to the surface at the position R) of the upper plate 25a at the position R increased by 70%.

In the sub air chamber member 10 of such a conventional vehicle wheel, the tube body 18 which acts to increase the mass factor of the centrifugal force ($F=mr\omega^2$: where m is the mass, r is the radius, and $\omega$ is the angular speed) is disposed at the central portion, with respect to the wheel width direction Y, of the main body portion 13, the central portion being distant from the edged portions 14a, 14b firmly constrained by the first and second standing wall surfaces 16a, 16b. This is also a cause of increasing the deformation amount. This increase in the deformation amount releases the engaging fitting of the both edge portions 14a, 14b to the first and second standing wall surfaces 16a, 16b. Further, the increase in the deformation amount significantly decreases the critical rotational speed, of the wheel, that detaches the sub air chamber member 10 from the well portion.

In this situation, an object of the invention is to provide a vehicle wheel that allows setting the critical rotational speed of the wheel higher than the critical rotational speed of a conventional vehicle wheel whose protruding portion forming a communication hole is disposed at the end portion, with respect to the wheel circumferential direction, of a sub air chamber member.

Means for Solving the Problems

For solution of the above-described problems, according to the present invention, a vehicle wheel includes: a sub air chamber member which serves as a Helmholtz resonator and is fixed to an outer circumferential surface of a well portion in a tire air chamber; a first standing wall surface formed such as to stand from the outer circumferential surface of the well portion outward in radial direction and extend in circumferential direction of the outer circumferential surface; and a second standing wall surface formed on the well portion such as to face the first standing wall surface in width direction of the outer circumferential surface, wherein the sub air chamber member includes: a main body portion longitudinal in the circumferential direction, the main body portion including a bottom plate disposed on the outer circumferential surface side of the well portion, and an upper plate forming a sub air chamber between the upper and and bottom plates; edge portions that join the bottom plate and the upper plate at both side portions, with respect to the width direction, of the main body portion, and are engagingly fixed to respective groove portions formed on the first standing wall surface and the second standing wall surface; and a protruding portion that is arranged such as to protrude from an end portion with respect to the longitudinal direction of the main body portion, in the circumferential direction, and is provided inside thereof with a communication hole for communication between the sub air chamber and the tire air chamber, and wherein the protruding portion is arranged being biased in the width direction of the main body portion from a central portion to a side of either of the edge portions.

This vehicle wheel is provided with a protruding portion that is engagingly fixed to either of the first standing wall surface and the second standing wall surface, wherein the protruding portion is biased to the end portion firmly constrained to the either of these standing wall surfaces. Thus, this vehicle wheel can more effectively prevent the deformation of a sub air chamber member when a centrifugal force is applied to the protruding portion unlike a conventional vehicle wheel (for example, see FIG. 9B of Patent Literature 1) in which a protruding portion is disposed at the central portion, with respect to the width direction, of a main body portion.

Further, it is preferable that this vehicle wheel includes: an extending portion formed by a plate shaped body extending from end portions, with respect to wheel circumferential direction, of the main body portion and the end portions, wherein the protruding portion is formed in integration with the extending portion.

This vehicle wheel makes it possible to reduce the deformation of the protruding portion itself being supported by the extending portion. Thus, the vehicle wheel realizes a stable silencing function.

In this vehicle wheel, the protruding portion is preferably formed such as to protrude in the wheel circumferential direction further than an end portion, with respect to the wheel circumferential direction, of the extending portion.

In this vehicle wheel, the extending portion is further back than the protruding portion toward the main body portion, forming a step. As a result, the stiffness of the extending portion is increased so that the deformation of the sub air chamber member, at the time when a centrifugal force is applied to the protruding portion, is further effectively prevented.

In this vehicle wheel, the communication hole preferably has a cross-sectional shape longitudinal in wheel radial direction.

In such a vehicle wheel, as the communication hole is longitudinal in the wheel radial direction, it is possible to arrange the protruding portion, the protruding portion being provided with the communication hole, with a bias to the edge portion. Thus, this vehicle wheel further more effectively prevents the deformation of the sub air chamber member when a centrifugal force is applied to the protruding portion.

In this vehicle wheel, the communication hole is preferably in a tongue shape that is longitudinal.

In such a vehicle wheel, as the tip end of a tongue shape, in a cross-sectional view, of the communication hole has a curved shape. Thus, the stiffness of the protruding portion itself including this communication hole therein is increased. As a result, the deformation, at the time when a centrifugal force is applied to the protruding portion, can be further effectively prevented.

In this vehicle wheel, it is preferable that: the first standing wall surface is formed on an annular standing wall standing at the well portion; wherein the sub air chamber member includes a rotation preventing member that protrudes in wheel width direction from the either of the edge portions to prevent the sub air chamber member from deviating in the wheel circumferential direction by that the rotation preventing member is fitted into a cut-away portion formed on the standing wall; and wherein the protruding portion is formed, being biased to the edge portion on which the rotation preventing member is formed.

In such a vehicle wheel, when the sub air chamber member is attached to the rim, the rotation preventing member is fitted to the cut-away portion and the edge portion on the side of this rotation preventing member is engagingly fixed to the first standing wall surface. Then, the edge portion on the side opposite to this end portion is pressed toward the rim, and this edge portion is engagingly fixed to the second standing wall surface.

In this vehicle wheel, as the protruding portion is formed, being biased to the edge portion where the rotation preventing member is formed. Accordingly, when the edge portion on the side opposite to this edge portion is pressed toward the rim, the sub air chamber member can be easily attached to the rim without disturbance by the protruding portion in this pressing.

In this vehicle wheel, the sub air chamber member is preferably formed from a resin.

This vehicle wheel makes it possible to realize reduction in weight, improvement of mass productivity, reduction in manufacturing cost, ensuring air tightness of the sub air chamber, and the like of the sub air chamber member.

Advantages of the Invention

In comparison with a conventional vehicle wheel in which a protruding portion forming a communication hole is disposed at the end portion, with respect to the wheel circumferential direction, of a sub air chamber member, a vehicle wheel according to the invention makes it possible to effectively prevent the deformation of a sub air chamber member caused when a centrifugal force is applied to a protruding portion. Thus, for a vehicle wheel according to the present invention, the critical rotational speed of the wheel can be set to a higher speed than for a conventional wheel.

BRIEF DESCRIPTION OF THE DRAWINGS

FIG. 6 is a partial enlarged perspective view in the vicinity of the protruding portion of a sub air chamber member of the vehicle wheel in the embodiment of the invention, representing the state of deformation of the sub air chamber member due to the centrifugal force generated at the maximum assumed rotational speed of the wheel, as deformation amount distribution; and FIG. 7 is a partial enlarged perspective view in the vicinity of the protruding portion of a sub air chamber member of a conventional vehicle wheel, representing the state of deformation of the sub air chamber member due to the centrifugal force generated at the maximum assumed rotational speed of the wheel, as deformation amount distribution.

EMBODIMENT FOR CARRYING OUT THE INVENTION

Figure 1:
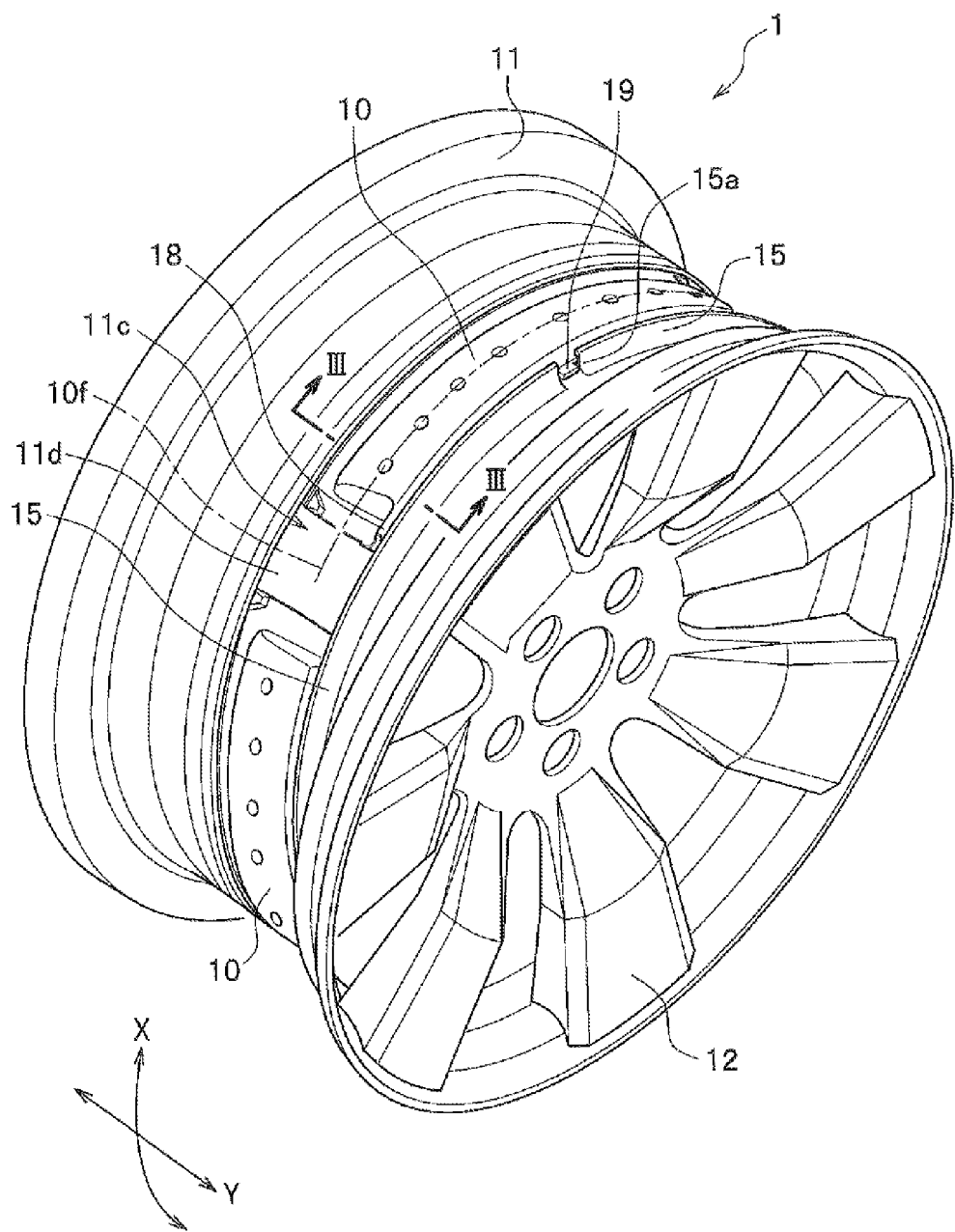
FIG. 1 is a perspective view of a vehicle wheel according to an embodiment of the present invention.

An embodiment according to the present invention will be described below in detail, referring to the drawings appropriately.

FIG. 1 is a perspective view of a vehicle wheel 1 according to an embodiment of the present invention.

As shown in FIG. 1, the vehicle wheel 1 in this embodiment includes a plurality of sub air chamber members 10, which serve as Helmholtz resonators, at equal intervals along the wheel circumferential direction X. Although a vehicle wheel having four sub air chambers 10 is shown in this embodiment, a vehicle wheel according to the present invention may have two, three, or more than four sub air chamber members 10.

The vehicle wheel 1 in this embodiment is primarily featured by that a tube body 18 having a later-described communication hole 18a (see FIG. 2) inside the tube body 18 is formed such as to be biased to a later-described edge portion 14a (see FIG. 2) from the central portion, with respect to the wheel width direction Y, of the sub air chamber member 10.

Herein, the entire configuration of the vehicle wheel 1 will be first described.

The vehicle wheel 1 in this embodiment is provided with a rim 11 and a disc 12 for connecting the rim 11 to a hub (not shown). In FIG. 1, symbol 11d represents the outer circumferential surface of a well portion 11c, and a sub air chamber member 10 is fitted into the well portion 11c, as described later in detail. Further, symbol 15 represents an annular standing wall standing at the outer circumferential surface 11d of the well portion 11c such as to extend along the circumferential direction of the rim 11. Incidentally, the sub air chamber member 10 is as described later engagingly fixed to the standing wall 15. Symbol 15a represents a cut-away portion, of the standing wall 15, into which a rotation preventing member 19 is fitted when the sub air chamber member 10 is engagingly fixed to the standing wall 15.

Figure 2:
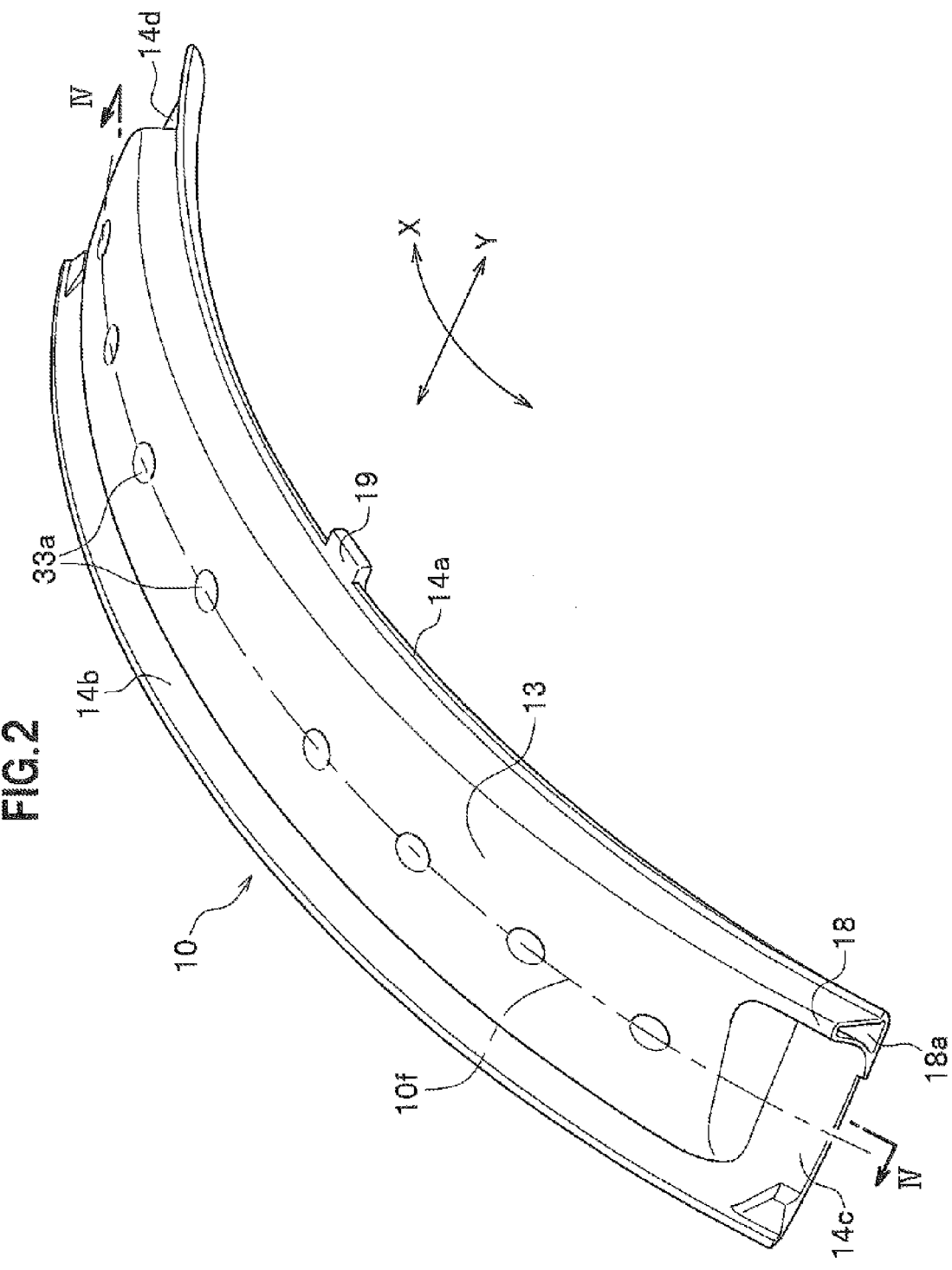
FIG. 2 is an entire perspective view of a sub air chamber member.

FIG. 2 is an entire perspective view of a sub air chamber member 10.

The sub air chamber member 10 is a member which is longitudinal in one direction (wheel circumferential direction X), as shown in FIG. 2, and is provided with a main body portion 13, a tube body 18, edged portions 14a, 14b, and extending portions 14c, 14d.

Incidentally, the tube body 18 corresponds to 'protruding portion' set forth in claims.

The main body portion 13 is longitudinally formed such as to curve, matching the curvature along the circumferential direction of the outer circumferential surface 11d (see FIG. 1), and has a sub air chamber SC (see FIG. 3) inside thereof, as described later.

The tube body 18 is arranged such as to protrude in the wheel circumferential direction X from the end portion with respect to the longitudinal direction (the end portion with respect to the wheel circumferential direction X) of the main body portion 13, in other words, in the circumferential direction of the outer circumferential surface 11d (see FIG. 1).

The tube body 18 is arranged such as to be biased to the edge portion 14a from the center line 10f with respect to the wheel width direction Y of the main body portion 13, in other words, the width direction of the outer circumferential surface 11d (see FIG. 1).

The communication hole 18a is formed inside the tube body 18. The communication hole 18a makes the sub air chamber SC (see FIG. 3) inside the main body portion 13 and a later-described tire air chamber MC (see FIG. 3) communicate with each other.

Figure 3:
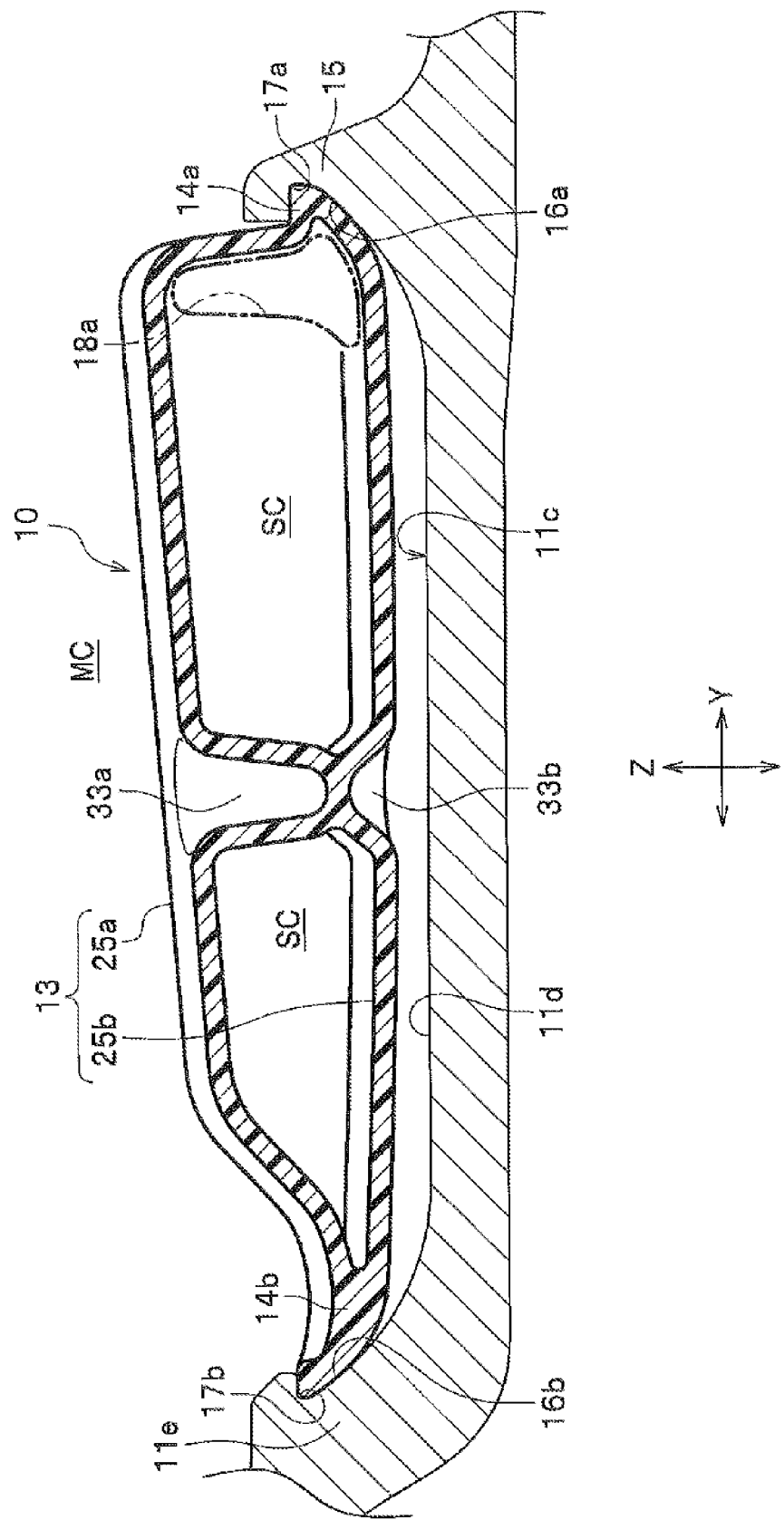
FIG. 3 is a cross-sectional view of the sub air chamber member disposed on a well portion, and is a partial enlarged cross-sectional view taken along the line III-III in FIG. 1.

The cross-sectional shape of the communication hole 18a is preferably a cross-sectional shape, which is longitudinal in wheel radial direction Z (see FIG. 3).

As described above, although the tube body 18 having such a communication hole 18a is biased to the edge portion 14a in this embodiment, it is also possible according to the invention to make an arrangement such that the tube body 18 is biased to the edge portion 14*b*.

The edge portion 14*a* and the edge portion 14*b* are formed along the respective side portions, with respect to the wheel width direction Y, of the main body portion 13, and extend in the wheel circumferential direction X. The edge portions 14*a*, 14*b* are engagingly fixed respectively to the first standing wall surface 16*a* (see FIG. 3) and the second standing wall surface 16*b* (see FIG. 3). The first standing wall surface 16*a* is formed on the annular standing wall 15 standing from the well portion 11*c* (see FIG. 1). The second standing wall surface 16*b* is formed on the well portion 11*c*, facing the first standing wall surface 16*a* in the wheel width direction Y. The edge portion 14*a* and the edge portion 14*b* are engagingly fixed respectively to a groove portion 17*a* (see FIG. 3) formed on the first standing wall surface 16*a* and a groove portion 17*b* (see FIG. 3) formed on the second standing wall surface 16*b* to thus fix the main body portion 13 to the well portion 11*c*.

The extending portion 14*c* and the extending portion 14*d* are formed by integrating the plate-shaped body portion extending in the wheel circumferential direction X from the end portion, with respect to the wheel circumferential direction X, of a later-described bottom plate 25*b* (see FIG. 3) of the main body portion 13, and plate-shaped portions extending in the wheel circumferential direction X from the end portions, with respect to the wheel circumferential direction X, of the edge portions 14*a*, 14*b*. Incidentally, the extending portions 14*c*, 14*d* are located on an extension, in the wheel circumferential direction X, of the edge portions 14*a*, 14*b*, being curved to match the curvature, with respect to the circumferential direction, of the outer circumferential surface 11*d* (see FIG. 1).

Incidentally, symbol 19 represents a rotation preventing member for preventing the sub air chamber member 10 from deviation along the wheel circumferential direction X by that the rotation preventing member 19 is fitted into the cut-away portion 15*a* (see FIG. 1) of the standing wall 15 (see FIG. 1) when the sub air chamber member 10 is fixed to the outer circumferential surface 11*d* (see FIG. 1) of the well portion 11*c* (see FIG. 1). The rotation preventing member 19 is formed by a piece formed in a rectangular shape in a plan view formed such as to protrude from the edge portion 14*a* in the wheel width direction Y.

Symbol 33*a* represents a later-described upper joint portion (see FIG. 3).

FIG. 3 referred to below is a cross-sectional view of the sub air chamber member 10 disposed on the well portion 11*c*, and is a partial enlarged cross-sectional view taken along the line III-III in FIG. 1.

As shown in FIG. 3, the main body portion 13 of the sub air chamber member 10 is provided with a bottom plate 25*b* and an upper plate 25*a* forming a sub air chamber SC between the upper and bottom plates 25*a*, 25*b*. Incidentally, although the upper and bottom plates 25*a*, 25*b* have the same thickness in this embodiment, the upper and bottom plates 25*a*, 25*b* may have different thicknesses respectively.

The upper plate 25*a* forms the sub air chamber SC by curving such as to have a bulge above the bottom plate 25*b* disposed along the outer circumferential surface 11*d* of the well portion 11*c*.

The upper plate 25*a* is provided with upper joint portions 33*a* at the part that constructs the main body portion 13. These upper joint portions 33*a* are formed such that the upper plate 25*a* is partially recessed toward the sub air chamber SC, and are in a circular shape in plan view. As shown in FIG. 2, these upper joint portions 33*a* are formed in a quantity of eight such as to be arrayed in a line of the center line 10*f* of the main body portion 13, along the longitudinal direction (wheel circumferential direction X) of the sub air chamber member 10.

Returning again to FIG. 3, the bottom plate 25*b* is provided with bottom-side joint portions 33*b* at the positions corresponding to the upper joint portions 33*a*.

These bottom-side joint portions 33*b* are formed such that the bottom plate 25*b* is partially recessed toward the sub air chamber SC, and are in a circular shape in a plan view. These bottom-side joint portions 33*b* are integrated at the tip end portions thereof with the tip end portions of the upper joint portions 33*a* of the upper plate 25*a* to thus join the upper and bottom plates 25*a*, 25*b*.

Incidentally, in the present invention, it is also possible to arrange a structure without such upper joint portions 33*a* and bottom-side joint portions 33*b*.

Figure 4:
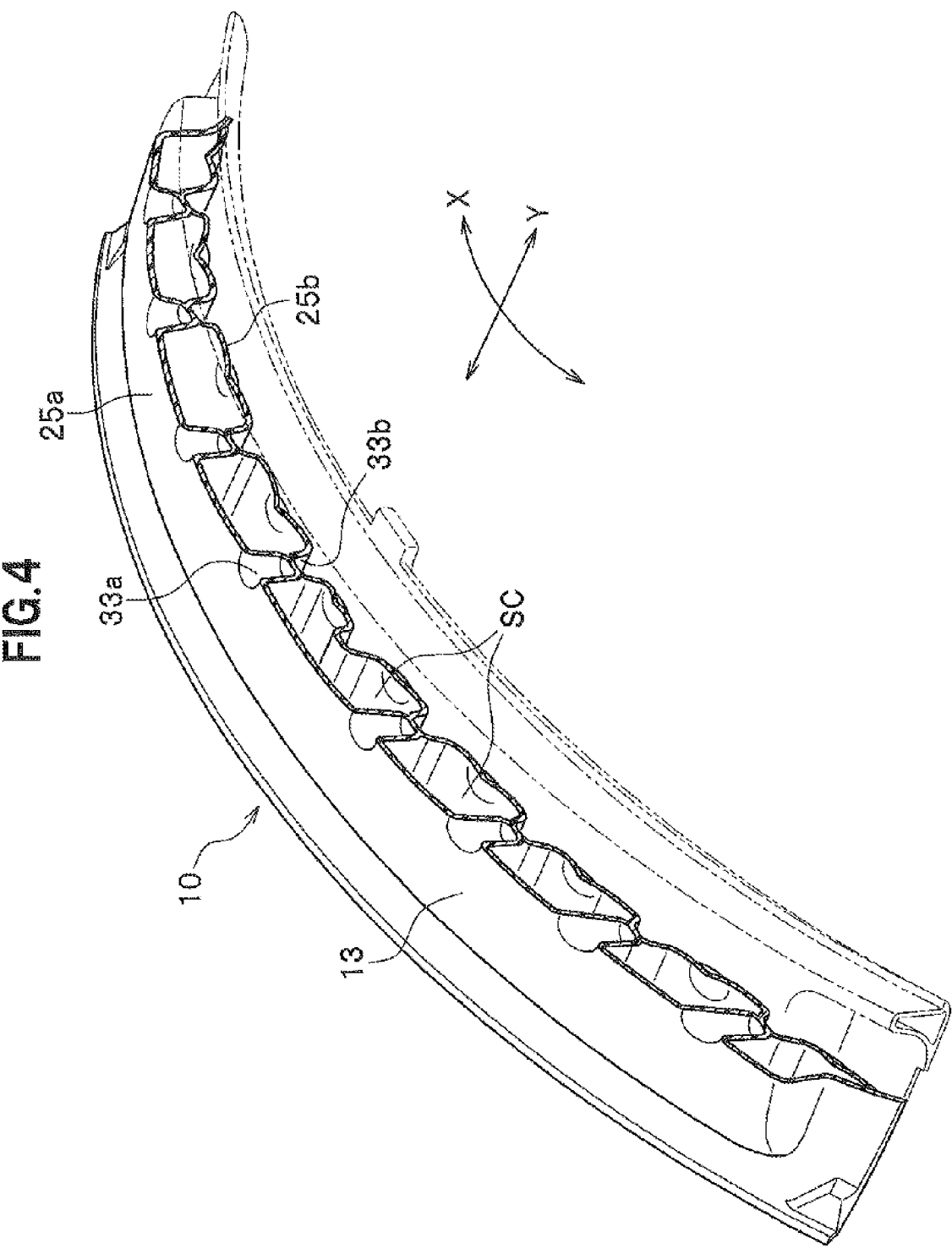
FIG. 4 is a perspective view showing the sub air chamber member cut away along the line IV-IV in FIG. 2.

FIG. 4 referred to below is a cross-sectional perspective view of the sub air chamber member 10 cut off by line IV-IV in FIG. 2.

As shown in FIG. 4, the upper joint portions 33*a* and the bottom-side joint portions 33*b* joined with each other in the sub air chamber SC have a structure that improves the mechanical strength of the sub air chamber member 10 and also enables greater effect on a later-described silencing function by reducing variation in the inner volume of the sub air chamber SC.

The inner volume of the sub air chamber SC is preferably 50-250 cc approximately. By setting the inner volume of the sub air chamber SC in this range, the sub air chamber member 10 can have sufficient effect on silencing and meanwhile enables reduction in the weight of the vehicle wheel 1 (see FIG. 1) by inhibiting an increase in the weight thereof. Further, the length of the sub air chamber member 10 along the wheel circumferential direction X (see FIG. 2) can be appropriately set in consideration of adjusting the weight of the vehicle wheel 1 and easiness in attaching to the well portion 11*c*, with the length of a half of the circumferential length (the circumferential length of the outer circumferential surface 11*d* (see FIG. 1) of the well portion 11*c* (see FIG. 1)) of the rim 11 (see FIG. 1) as the maximum length.

Incidentally, in FIG. 4, symbol 13 represents the main body portion, symbol 25*a* represents the upper plate, and symbol 25*b* represents the bottom plate.

Returning to FIG. 3 again, the communication hole 18*a* for communication between the tire air chamber MC and the sub air chamber SC is as described above has a cross-sectional shape longitudinal in the wheel radial direction Z. Concretely, in FIG. 3, as shown by virtual lines (alternate long and two short dashes lines), the cross-sectional shape of the communication hole 18*a* is wider on the bottom plate 25*b*, and tapers from the bottom plate 25*b* toward the outside in the wheel radial direction Z. Although the communication hole 18*a* preferably has a cross-sectional shape that is longitudinal in the wheel radial direction Z, the communication hole 18*a* may have a different cross-sectional shape such as a polygonal shape instead of a longitudinal shape. Incidentally, the cross-sectional area of the communication hole 18*a* preferably has a diameter larger than or equal to 5 mm if converted into a circular shape with the same cross-sectional area.

The length of a communication hole 18*a* is set such as to satisfy an expression for obtaining a resonant vibration frequency of a Helmholtz resonator, the expression being described by the following Expression 1.

$$f_0 = C/2\pi \times \sqrt{(S/V(L+\alpha \times \sqrt{S}))} \qquad \text{Expression 1}$$

$f_0$ (Hz): resonant vibration frequency

C (m/s): sonic speed inside sub air chamber SC (=sonic speed inside tire air chamber MC)

V (m³): inner volume of sub air chamber SC

L (m): length of communication hole 18a

S (m²): cross-sectional area of opening portion of communication hole 18a

α: correction factor

Incidentally, the resonant vibration frequency $f_0$ is matched to the resonant vibration frequency of the tire air chamber MC.

The tube body 18 having such a communication hole 18a in this embodiment is preferably formed, as shown in FIG. 2, such as to protrude in the wheel circumferential direction X further than the end portion, with respect to the wheel circumferential direction X, of the extending portion 14c.

Returning to FIG. 3 again, the edge portion 14a and the edge portion 14b join the bottom plate 25b and the upper plate 25a.

The tip ends of the edge portion 14a and the edge portion 14b are fitted respectively into the groove portion 17a of the first standing wall surface 16a and the groove portion 17b of the second standing wall surface 16b.

The thicknesses of the edge portions 14a, 14b, and the extending portions 14c, 14d (see FIG. 2) in this embodiment are set substantially the same as the thicknesses of the bottom plate 25b and the upper plate 25a. These edge portions 14a, 14b and the extending portions 14c, 14d have spring elasticity by appropriate selection of thickness and material thereof.

Although the sub air chamber member 10 in the above-described embodiment is made of (but is not limited to) a resin, the sub air chamber member 10 may be made of other materials such as metal. Incidentally, in a case of resin molding, in consideration of weight saving of the sub air chamber member 10, improvement in mass-productivity, reduction in manufacturing cost, ensuring the airtightness of the sub air chamber SC, and the like, a resin that allows blow-molding and is light and highly rigid is preferable. Particularly, polypropylene, which is durable against repeated bending fatigue, is preferable.

The rim 11 to which the sub air chamber member 10 is fitted will be described below.

The rim 11 has the well portion 11c, which is recessed toward the inner side (rotation center side) with respect to the wheel radius direction, between the bead sheet portions (not shown) of a tire, the bead sheet portions being formed at the both end portions with respect to the wheel width direction Y shown in FIG. 1.

The well portion 11c is provided in order to put in the bead portions (not shown) of a tire (not shown) in attaching the tire to the rim 11. Incidentally, the well portion 11c in this embodiment is formed in a cylindrical shape with substantially the same diameter throughout the wheel width direction Y.

The annular standing wall 15 stands from the outer circumferential surface 11d of this well portion 11c such as to extend along the circumferential direction of the rim 11.

Returning again to FIG. 3, the standing wall 15 is arranged, standing from the outer circumferential surface 11d such as to form the first standing wall surface 16a standing from the outer circumferential surface 11d of the well portion 11c to the outer side with respect to the wheel radial direction Z (the upper side in the sheet of FIG. 3, the same hereinafter).

The side surface portion 11e formed on the inner side (left side in the sheet of FIG. 3), with respect to the wheel width direction Y, of the well portion 11c is provided with the second standing wall surface 16b that is arranged such as to substantially face the first standing wall surface 16a. Incidentally, the standing wall 15 in this embodiment is integrally formed with the well portion 11c in casting the rim 11.

The first standing wall surface 16a and the second standing wall surface 16b are respectively provided with the groove portion 17a and the groove portion 17b. The groove portions 17a and 17b are formed along the circumferential direction of the outer circumferential surface 11d of the well portion 11c and form annular circumferential grooves. The edge portion 14a and the edge portion 14b of the sub air chamber member 10 are fitted in the groove portions 17a and 17b. Incidentally, the groove portions 17a and 17b in this embodiment are formed by machining the standing wall 15 and the side surface portion 11e respectively.

Figure 5A:
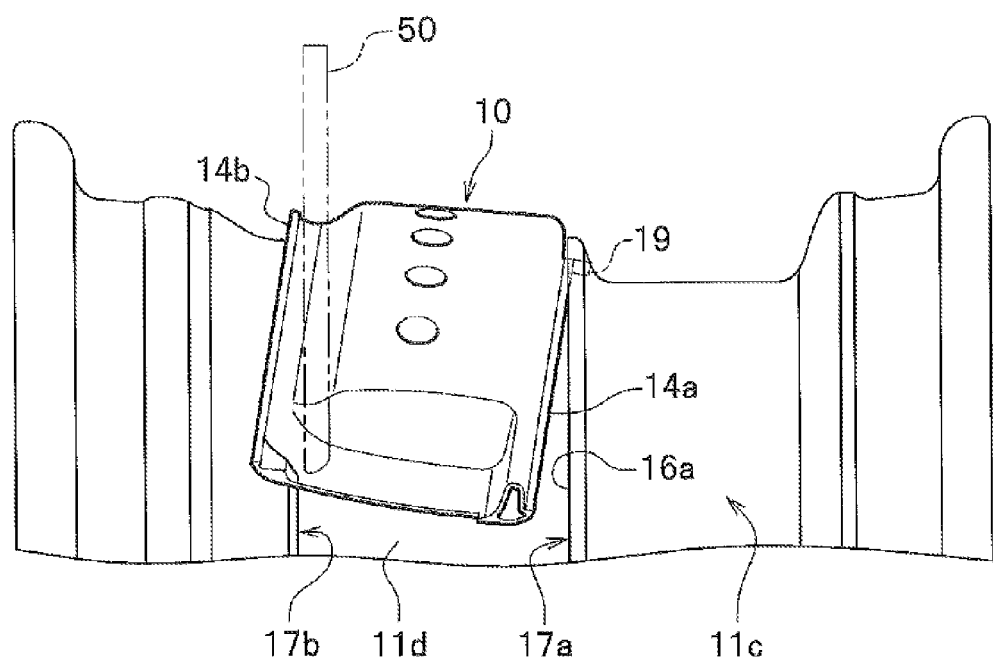
FIGS. 5A and 5B are process illustration for illustration of a method of attaching a sub air chamber member to the well portion of a rim.
Figure 5B:
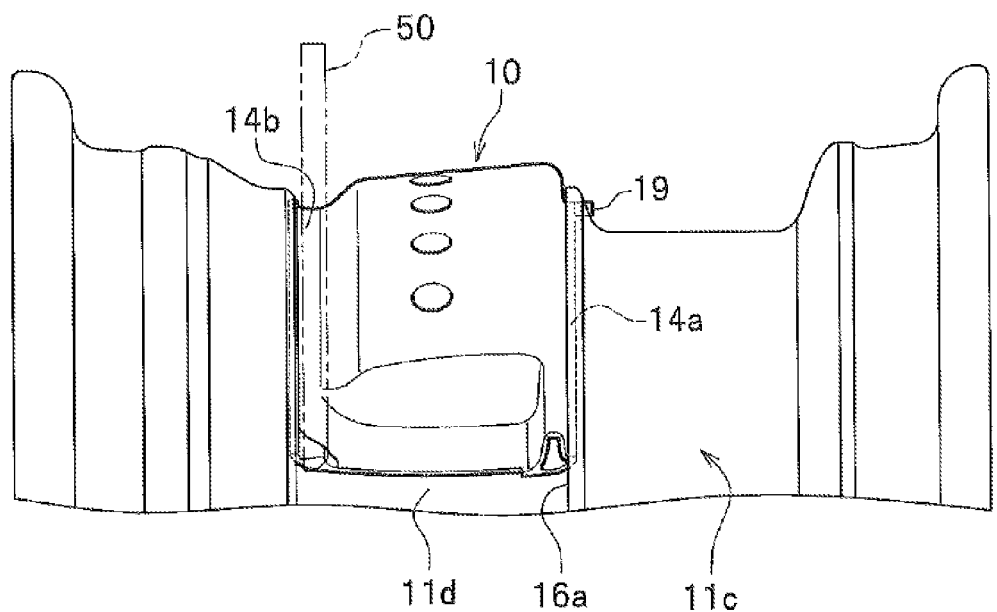

The method of attaching the sub air chamber member 10 to the well portion 11c will be described below. FIGS. 5A and 5B are process illustrations for illustrating a method for attaching the sub air chamber member 10 to the well portion 11c.

Incidentally, attaching of the sub air chamber member 10 to the well portion 11c in this embodiment assumes using a pusher (pressing device) 50 (see FIGS. 5A and 5B) for pressing the edge portion 14b at a position close to the groove portion 17b toward the outer circumferential surface 11d of the well portion 11c.

As the pusher 50, for example, one that presses the edge portion 14b (see FIGS. 5A and 5B) by the air pressure of an air cylinder can be adopted.

Incidentally, in FIGS. 5A and 5B, the pusher 50 is shown by virtual lines (alternate long and two short dashes lines) for the convenience of drawing.

Although the pusher 50 used in this embodiment is (but is not limited to) a plate shaped member provided with an edge portion having an arc-shaped outline with a curvature in the longitudinal direction (the wheel circumferential direction X in FIG. 2), of the sub air chamber member 10, a design of the pusher 50 can be changed appropriately.

In this attaching method, as shown in FIG. 5A, first, the sub air chamber member 10 is inclined, and the edge portion 14a located in the vicinity of the rotation preventing member 19 is partially fitted into the groove portion 17a of the first standing wall surface 16a. Herein, as shown in FIG. 1, the rotation preventing member 19 is fitted into the cut-away portion 15a of the standing wall 15.

Then, in FIG. 5A, the pusher 50 shown by virtual lines is made contact with the edge portion 14b. Symbol 11d represents the outer circumferential surface of the well portion 11c.

Then, as shown in FIG. 5B, when the pusher 50 presses the edge portion 14b toward the outer circumferential surface 11d of the well portion 11c, as the inclination angle of the sub air chamber member 10 to the outer circumferential surface 11d of the well portion 11c becomes smaller, the edge portion 14a on the both sides sandwiching the rotation preventing member 19 is gradually fitted into the groove portion 17a of the first standing wall surface 16a.

Herein, the edge portion 14b having spring elasticity warps, corresponding to the magnitude of the pressing force of the pusher 50.

Then, when the edge portion 14b is further pressed toward the outer circumferential surface 11d of the well portion 11c, as shown in FIG. 3, the edge portion 14a and the edge portion 14b are completely fitted respectively into the groove portion 17a formed on the first standing wall surface 16a and the groove portion 17b formed on the second standing wall surface 16*b*. Thus, the sub air chamber member 10 is fitted to the well portion 11*c*.

The actions and effects of the vehicle wheel 1 in this embodiment will be described below.

As shown in FIG. 3, the vehicle wheel 1 is engagingly fixed by that the edge portions 14*a*, 14*b* are fitted into the groove portions 17*a*, 17*b* of the first and second standing wall surfaces 16*a*, 16*b*.

On the sub air chamber member 10 fixed to the outer circumferential surface 11*d* of the well portion 11*c*, the action by the constrain forces caused by engaging fitting of the edge portions 14*a*, 14*b* to the first and second standing wall surfaces 16*a*, 16*b* is less significant at the end portion with respect to the wheel circumferential direction X and the extending portion 14*c* than in a region closer to the central portion, with respect to the wheel circumferential direction X, of the main body portion 13. Accordingly, the deformation amount caused by the centrifugal force during rotation of the wheel is larger at the end portion with respect to the wheel circumferential direction X and the extending portion 14*c* than in a region closer to the central portion.

In a conventional sub air chamber member 10, the tube body 18 protrudes in the wheel circumferential direction X from the position that is at the end portion, with respect to the wheel circumferential direction X, of the main body portion 13 and is substantially the central position with respect to the wheel width direction Y. As shown in FIG. 7, in a conventional sub air chamber member 10, the darkest shaded portion 10*a* with the largest deformation amount (lifted degree) out of the shaded portions categorized in three kinds by gray scale is largely distributed along the wheel circumferential direction X of the sub air chamber member 10.

In the sub air chamber member 10 of such a conventional vehicle wheel, at the central portion, with respect to the wheel width direction Y, of the main body portion 13, the central portion being distant from the edge portions 14*a*, 14*b* which are firmly constrained by the first and second standing wall surfaces 16*a*, 16*b*, disposed is the tube body 18, which increases the mass factor of the centrifugal force ($F=mrw^2$: m mass, r radius, ω angular speed). This also causes an increase in the deformation amount at the central portion with respect to the wheel width direction Y. The increase in the deformation amount significantly decreases the critical rotational speed of the wheel, the critical rotational speed detaching the sub air chamber member 10 from the well portion.

On the other hand, as described above, in the vehicle wheel 1 in this embodiment, the tube body 18 is arranged such as to be biased to the edge portion 14*a* from the center line 10*f* with respect to the wheel width direction Y of the main body portion 13, in other words, the width direction of the outer circumferential surface 11*d* (see FIG. 1).

FIG. 6 referred to below is a partial enlarged perspective view in the vicinity of the tube body 18 of the sub air chamber member 10 of the vehicle wheel 1 in the embodiment, representing the state of deformation of the sub air chamber member 10 due to the centrifugal force generated at the maximum assumed rotational speed of the wheel, as deformation amount distribution.

Incidentally, the deformation amount herein was obtained by a simulation testing by CAE (Computer Aided Engineering).

The shaded portion 10*a* out of the shaded portions categorized in three kinds by gray scale represents the region with the largest deformation amount (lifted degree) from the outer circumferential surface 11*d* of the well portion 11*c* (see FIG. 3) to the centrifugal direction. The shaded portion 10*b* represents the region with a medium deformation amount (lifted degree). The shaded portion 10*c* represents the region with a small deformation amount (lifted degree). The hollow portion 10*d* represents the region with little deformation.

As shown in FIG. 6, in the sub air chamber member 10 in this embodiment, the shaded portion 10*a* with the largest deformation amount (lifted degree) is significantly reduced than in the sub air chamber member of the conventional vehicle wheel shown in FIG. 7. Further, unlike the conventional sub air chamber member of a conventional vehicle wheel 1, the darkest shaded portion 10*a* at the extending portion 14*c* ends at the vicinity of the center line 10*f* with respect to the wheel width direction Y, being separated from the darkest shaded portion 10*a* at the main body portion 13. Further, also in the region where the tube body 18 acting to increase the mass factor of centrifugal force is biased to the edge portion 14*a*, the deformation amount (lifted degree) is small to be within the deformation amount of the shaded portion 10*c*.

Incidentally, although not shown, in comparison with a sub air chamber member with assumption that the tube body 18 is not present at the end portion of the main body portion 13, the deformation amount, at the center in the wheel width direction Y, of the extending portion 14*c* shown in FIG. 6 increased only by 13% (The deformation amount, to the centrifugal direction, of the portion formed by integration of the tube body 18 and the extending portion 14*c* in FIG. 7 increased by 33%.) The deformation amount (the displacement length at position Q in the direction perpendicular to the surface) of the bottom plate (not shown) at position Q increased only by 45% (increased by 64% in FIG. 7). The deformation amount (the displacement length at position R in the direction perpendicular to the surface) of the upper plate 25*a* at position R increased only by 40% (increased by 70% in FIG. 7).

In the vehicle wheel 1 in this embodiment, the tube body 18 is arranged such as to be biased to the edge portion 14*a*, which is engagingly fixed to the first standing wall surface 16*a* and firmly constrained by the first standing wall surface 16*a*. Thus, unlike the sub air chamber member 10 (see FIG. 7) of a conventional vehicle wheel, the deformation of the sub air chamber member 10 of this vehicle wheel 1 is effectively prevented when a centrifugal force is applied to the tube body 18.

Accordingly, the vehicle wheel 1 in this embodiment makes it possible to set the critical rotational speed of the wheel (the critical rotational speed at which the sub air chamber member 10 is detached from the well portion 11*c*) higher than the critical rotational speed of a conventional wheel.

Further, in the vehicle wheel 1, the protruding portion 18 is formed integrally with the extending portion 14*c*. Accordingly, the vehicle wheel 1 makes it possible to reduce the deformation of the protruding portion 18 itself being supported by the extending portion 14*c*. Thus, the vehicle wheel 1 realizes a stable silencing function.

Further, in the vehicle wheel 1, the protruding portion 18 protrudes in the wheel circumferential direction X further than the end portion, with respect to the wheel circumferential direction X, of the extending portion 14*c*. Accordingly, in the vehicle wheel 1, the extending portion 14*c* is further back than the protruding portion 18 toward the main body portion 13, forming a step. As a result, the stiffness of the extending portion 14*c* is increased so that the deformation of the sub air chamber member 10, at the time when a centrifugal force is applied to the protruding portion 18, is further effectively prevented.

Further, in the vehicle wheel 1 in this embodiment, as the communication hole 18a (see FIG. 3) has a cross-sectional shape longitudinal in the wheel radial direction Z (see FIG. 3), it is possible to arrange the tube body 18, the tube body 18 being provided with the communication hole 18a, with a bias to the edge portion 14a. Thus, the vehicle wheel 1 further more effectively prevents the deformation of the sub air chamber member 10 when a centrifugal force is applied to the tube body 18, and it is thereby possible to set the critical rotational speed of the wheel to an even higher speed than conventionally.

Still further, as the communication hole 18a has a longitudinal tongue shape, the tip end of the tongue shape is in a curved shape. Thus, the stiffness of the protruding portion 18 itself including the communication hole 18a therein is increased. As a result, the vehicle wheel 1 further more effectively prevents the deformation of the sub air chamber member 10 when a centrifugal force is applied to the tube body 18.

Yet further, the tube body 18 is arranged being biased to the edge portion 14a where the rotation preventing member 19 is formed. Accordingly, as described above, it is possible to avoid the protruding portion 18 from interference with the pusher 50 in pressing the edge portion 14b by the pusher 50. Thus, for this vehicle wheel 1, the sub air chamber member 10 can be easily attached to the rim 11 without disturbance by the protruding portion 18 in this pressing.

Further, as the sub air chamber member 10 is formed from a resin, this vehicle wheel 1 makes it possible to realize reduction in weight, improvement of mass productivity, reduction in manufacturing cost, ensuring air tightness of the sub air chamber SC, and the like of the sub air chamber member 10.

Although the above embodiment has been described above, the present invention is not limited to the above embodiment and can be carried out in various ways without limitation.

Although, in the above-described embodiment, the tube body 18 is formed integrally with the later-described extending portion 14c (see FIG. 2), it is also possible to make the tube body 18 protrude from the main body portion 13, separately and independently from the extending portion 14c.

Further, although, in the above-described embodiment, the communication hole 18a is arranged to have a cross-section in a longitudinal tongue shape, it is also possible by the invention to arrange a tube body 18 whose communication hole 18a has a cross-section in a shape of a longitudinal ellipse or a longitudinal polygon, and further, it is not required that the cross-sectional shape is longitudinal.

DESCRIPTION OF REFERENCE SYMBOLS

1: vehicle wheel
10: sub air chamber member (Helmholtz resonator)
10f: center line of main body portion
11c: well portion
11d: outer circumferential surface of well portion
13: main body portion
14a: edge portion
14b: edge portion
16a: first standing wall surface
16b: second standing wall surface
18: tube body (protruding portion)
18a: communication hole
25a: upper plate
25b: bottom plate
X: wheel circumferential direction
Y: wheel width direction
Z: wheel radial direction
SC: sub air chamber
SC1: first sub air chamber
SC2: second sub air chamber
MC: tire air chamber

The invention claimed is:
1. A vehicle wheel, comprising:
a sub air chamber member which serves as a Helmholtz resonator and is fixed to an outer circumferential surface of a well portion in a tire air chamber;
a first standing wall surface formed such as to stand from the outer circumferential surface of the well portion outward in radial direction and extend in circumferential direction of the outer circumferential surface; and
a second standing wall surface formed on the well portion such as to face the first standing wall surface in width direction of the outer circumferential surface,
wherein the sub air chamber member includes:
a main body portion longitudinal in the circumferential direction, the main body portion including a bottom plate disposed on the outer circumferential surface of the well portion, and an upper plate forming a sub air chamber between the upper and bottom plates;
edge portions that join the bottom plate and the upper plate at both side portions, with respect to the width direction, of the main body portion, and are engagingly fixed to respective groove portions formed on the first standing wall surface and the second standing wall surface; and
a protruding portion that is arranged such as to protrude from an end portion with respect to the longitudinal direction of the main body portion, in the circumferential direction, and is provided inside thereof with a communication hole for communication between the sub air chamber and the tire air chamber, and
wherein the protruding portion is arranged being biased in the width direction of the main body portion, from a central portion to a side of either of the edge portions.

2. The vehicle wheel according to claim 1, further comprising:
an extending portion formed by a plate shaped body extending from end portions, with respect to wheel circumferential direction, of the main body portion and the end portions,
wherein the protruding portion is formed in integration with the extending portion.

3. The vehicle wheel according to claim 2, wherein the protruding portion is formed such as to protrude in the wheel circumferential direction further than an end portion, with respect to the wheel circumferential direction, of the extending portion.

4. The vehicle wheel according to claim 1, wherein the communication hole has a cross-sectional shape longitudinal in wheel radial direction.

5. The vehicle wheel according to claim 4, wherein the communication hole is in a longitudinal tongue shape.

6. The vehicle wheel according to claim 1,
wherein the first standing wall surface is formed on an annular standing wall standing at the well portion, wherein the sub air chamber member includes a rotation preventing member that protrudes in wheel width direction from the either of the edge portions to prevent the sub air chamber member from deviating in the wheel circumferential direction by that the rotation preventing member is fitted into a cut-away portion formed on the standing wall, and wherein the protruding portion is formed, being biased to the edge portion on which the rotation preventing member is formed.

7. The vehicle wheel according to claim 1, wherein the sub air chamber member is formed from a resin.

\* \* \* \* \*